Patented June 28, 1932

1,865,177

UNITED STATES PATENT OFFICE

HENRY DREYFUS, OF LONDON, ENGLAND

MANUFACTURE OF ALIPHATIC ANHYDRIDES

No Drawing. Application filed March 21, 1929, Serial No. 348,978, and in Great Britain April 14, 1928.

This invention relates to the manufacture of anhydrides of alkyl ethers of hydroxy aliphatic acids or of their substitution products.

According to the invention I have found that anhydrides of alkyl ethers of hydroxy aliphatic acids or of substitution products (all hereinafter included in the term alkoxy aliphatic anhydrides) thereof may satisfactorily be prepared by subjecting the vapours of alkyl ethers of hydroxy aliphatic acids or substitution products thereof, (all hereinafter referred to as alkoxy aliphatic acids), to thermal decomposition in presence or absence of catalysts or contact materials. Thus for instance the anhydride of methoxy acetic acid

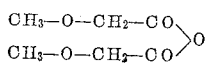

may readily be prepared by subjecting the vapour of methoxy acetic acid

to thermal decomposition.

The reaction may if desired be performed in presence of contact materials such for instance as pumice, fireclay, kieselguhr, graphite, carborundum or the like. Further, if desired, the reaction may be performed in presence of catalysts such for instance as one or more of the following:—one or more phosphoric acids (i. e. ortho-, meta- and pyrophosphoric acids); salts of ortho-, meta- or pyrophosphoric acids, e. g. their alkali metal, alkali earth metal, zinc or aluminium salts; "water binding agents", i. e. bisulphates, pyrosulphates (especially bisulphates and pyrosulphates of the alkali and alkali earth metals), zinc chloride and like substances which have a high affinity for water but excluding substances which have a deleterious effect on the alkoxy aliphatic acids or on their anhydrides, such as has sulphuric acid or sulphur trioxide; tungstic acid, and/or alkali earth metal tungstates (e. g. calcium or magnesium tungstate); carbons produced by the decomposition of organic substances under the action of heat (e. g. sugar charcoal, lamp black) or mixtures of such carbons with any of the foregoing catalysts; alkali metal chlorides; alkali metal sulphates; boric acid and/or alkali metal borates; copper turnings or finely divided copper.

Where catalysts are used for the reaction the same may, if desired, be employed, spread upon or deposited upon contact or filling materials, such for instance, as pumice, fireclay, kieselguhr, graphite, carborundum or the like.

The reaction may be performed at any suitable temperature above the boiling point of the alkoxy aliphatic acid, for instance, at temperatures of from about 300° to 1200° C. and preferably at temperatures of 500° to 800° C.

The reaction may be performed in any suitable way. Conveniently it may be performed by passing the vapour of the alkoxy aliphatic acid in a rapid stream through a reaction zone formed of copper, fireclay, silica or other tubes or apparatus heated to the desired temperature, which tubes or apparatus may be filled with or otherwise contain contact materials and/or catalysts such as before mentioned.

The reaction may be performed under ordinary atmospheric pressure or under reduced pressure or "vacuum" or even under higher pressures, such for instance as 3 to 5 or more atmospheres.

If desired, the vapours of the alkoxy aliphatic acids may be diluted with indifferent gases, e. g. nitrogen.

When the tubes or other apparatus forming the reaction zone are made wholly or partly from (or lined with) copper, nickel or other reducible metals (i. e. metals whose oxides are readily reducible by hydrogen or other reducing gases), or alloys containing such metals, or when the reaction is otherwise performed in presence of reducible metals I have found it advantageous to pass hydrogen or other reducing gas intermittently or continuously through the reaction zone during the passage of the alkoxy aliphatic acid vapour and/or prior to the passage of the alkoxy aliphatic acid vapour (for instance, during the heating up of the reaction zone or through the hot reaction zone immediately prior to the passing of the alkoxy aliphatic acid vapour). It is also advantageous to pass the reducing gas through the apparatus on stopping the reaction to prevent oxidation of the reaction zone during the cooling down. The passage of the reducing gas obviates or greatly reduces certain disadvantages which are liable to occur in practice when operating for prolonged periods with a reaction zone made of or containing copper or other reducible metal. Thus, for instance, when operating with such reaction zones for long periods or when re-starting the process after the apparatus has been allowed to cool down, the reaction is liable to become violent and produce considerable quantities of carbon, acetone and gaseous products with resultant loss of alkoxy aliphatic anhydride, which violent reaction may be largely or entirely obviated by the passage of reducing gas. On first starting up the apparatus, or on re-starting after disuse, it is advisable to ensure thorough chemical and mechanical cleanliness of the interior of a reducible metal reaction zone prior to heating to the reaction temperature and for this purpose the reaction zone is preferably washed with a suitable dilute acid (e. g. nitric acid) which washing is preferably followed successively by washing with water and scouring with steam; after scouring with steam the reaction zone may be heated to the reaction temperature and a current of hydrogen is preferably passed through the reaction zone during the heating up thereof.

I have also found that it is advantageous to mix carbon dioxide or mixtures of carbon dioxide and carbon monoxide with the alkoxy aliphatic acid vapour, such admixture being advantageous whether or not the reaction zone contains reducible metal. In absence of carbon dioxide (or carbon dioxide and carbon monoxide) after prolonged operation of the process, even when the reaction is performed in absence of reducible metals, there is often a deposition of carbon which coats and interferes with the action of the catalyst (where such is employed) and sometimes appears to cause destruction of the alkoxy aliphatic acid vapour to gaseous products. The carbon dioxide appears to prevent, in a large measure, deposition of carbon by burning out and removing from the reaction zone any carbon which may be formed, whilst the carbon monoxide appears to prevent oxidation and loss of the alkoxy aliphatic acid by combining with any air which may be present.

Instead of passing the alkoxy aliphatic acid vapour through a heated reaction zone the reaction may, for instance, be performed by mixing the alkoxy aliphatic acid vapour with an inert gaseous medium heated to temperatures above those at which it is desired to perform the decomposition to the anhydride. For instance, the alkoxy aliphatic acid vapour (at any convenient and lower temperature) may be mixed with nitrogen, hydrogen, steam or other inert gaseous medium preheated to a temperature above that at which it is desired to perform the reaction, e. g. to temperatures of from about 600° to 1200° C. and preferably 800° to 1000° C.

The anhydride may be recovered from the reaction gases or vapours (i. e. the gases or vapours produced by the thermal decomposition of the alkoxy aliphatic acid vapour) by any suitable method. In order to avoid loss of the anhydride through hydrolysis by water present or formed during the reaction it is preferable not to submit the reaction vapours to simple condensation and fractional distillation but to treat them to separate the anhydride from the water vapour. Conveniently the separation may be effected by subjecting the reaction gases or vapours to fractional condensation, for instance, by passing them upwards through one or more fractionating columns maintained at a temperature or temperatures intermediate between the boiling points (under the conditions of pressure obtaining) of the anhydride and of water, whereby the anhydride is condensed and the water passes on in vapour form. Or, for instance, the reaction vapours may be passed through a solvent or mixture of solvents for the anhydride which have higher boiling points than water and preferably higher boiling points than the anhydride and which are preferably insoluble in water and non-volatile in steam, such solvents being employed at temperatures intermediate between the boiling points (under the conditions of pressure obtaining) of water and of the anhydride, whereby the anhydride is condensed or absorbed and the water escapes in vapour form. As examples of such solvents may be mentioned chlorbenzene, paradichlorbenzene, paraffin oil, acetyl glycerins e. g. triacetin, phenetol, anisol, one or more cresols, paracresyl acetate.

Or, for instance, the reaction gases or vapours may be subjected to condensation in such way that the anhydride is condensed whilst the water vapour is carried away by the vapour of one or more entraining liquids. In such method of separation the reaction vapours are preferably mixed after leaving the hot reaction zone or vessel, with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. The following are examples of entraining liquids suitable for such method of condensation:—benzene, carbon tetrachloride, toluene, petrol, mixtures of two or more of such bodies, or mixtures of ether and petroleum; whilst toluene, xylene or other entraining liquids whose boiling points are intermediate between those of the anhydride and water are especially suitable; it will be understood however that any liquids chemically inert to the anhydride and having a high entraining capacity for water may be employed. The liquids should preferably have a low entraining capacity for the anhydride.

Or, for instance, the reaction gases or vapours may be subjected to condensation by leading them under the surface of an "extracting" liquid cooled down or otherwise kept at temperatures below (and preferably considerably below) the boiling point of water. By the term "extracting" liquid I mean a liquid or liquid mixture in which the anhydride is soluble and which is chemically inert to the anhydride and insoluble or substantially insoluble in water. As examples of such extracting liquids may be mentioned benzene, chloroform, and mixtures of ethyl ether or chloroform with one or more hydrocarbons such as light paraffins, gasoline, kerosene, benzol or its homologues. I preferably employ as extracting liquids, liquids which are themselves hydrocarbons or which contain hydrocarbons, for example, benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following extracting liquids are very suitable:— ether in admixture with petroleum ether, chloroform mixed with petroleum and/or gasoline; and mixtures of ether and petroleum ether containing about 30% to 50% petroleum ether are especially suitable.

Or, for instance, the reaction gases or vapours may be passed over or otherwise in contact with one or more "water binding" substances maintained at a temperature or temperatures below (and preferably substantially below) the temperature at which the reaction vapours are produced. In such treatment the water binding substances are preferably maintained at temperatures above the boiling point (under the conditions of pressure obtaining) of water to avoid condensation of water and the resulting risk of loss of anhydride through hydrolysis; and for the best functioning of the treatment the water binding substances should be employed at temperatures above the boiling point of the anhydride, in which case the water can be substantially absorbed and the anhydride pass on in vapour form. By the term "water binding" substances I mean bisulphates, pyrosulphates (especially bisulphates and pyrosulphates of the alkali and alkali earth metals), zinc chloride, calcium chloride, orthophosphoric acid, metaphosphoric acid, pyrophosphoric acid and like substances which have affinity (and preferably high affinity) for water but excluding substances having a deleterious effect on alkoxy aliphatic acids or anhydrides, such as sulphuric acid.

Or, for instance, the reaction gases or vapours may be caused to impinge upon a flowing stream of benzene (or other water insoluble solvent for the anhydride) whereby the gases or vapours are quickly cooled and condensed and the anhydride separated from the water. The benzene or the like so employed may be collected and the water layer (usually the lower layer) which separates out may be removed and the benzene (or equivalent layer) distilled to recover the anhydride.

It will of course be understood that in cases where the thermal decomposition of the alkoxy aliphatic acid is performed under pressures higher than atmospheric, the reaction gases or vapours should, prior to treatment for separation or recovery of the anhydride, preferably be passed through suitable apparatus (for instance one or more reducing valves) wherein the pressure is reduced substantially to normal atmospheric pressure.

The invention is not limited as to the strength of alkoxy aliphatic acid to be employed. The process can be performed even with the vapours of dilute acids or of concentrated or highly concentrated acids.

The following examples serve to illustrate convenient forms of execution of the invention, it being understood that they are given solely by way of illustration and are in no way limitative.

*Example 1*

Vapours of methoxy acetic acid are passed in a rapid stream through a fireclay or silica tube heated to a temperature between 500° and 700° C. and filled with pieces of pumice or silica coated with sodium bisulphate or pyrosulphate. The gases or vapours on leaving the heated tube are caused to pass up one or more fractionating columns maintained at a temperature or temperatures intermediate between the boiling point of methoxy acetic anhydride and of water, whereby the methoxy acetic anhydride is condensed and the water escapes in vapour form.

*Example 2*

Vapours of methoxy acetic acid are subjected to thermal decomposition in a manner similar to that described in Example 1, but instead of a fireclay or silica tube there is employed a copper tube. The copper tube is filled with pieces of pumice or kieselguhr coated with calcium chloride, and is heated to a temperature between 500° and 700° C. During the heating of the tube up to the reaction temperature and preferably also during the passage of the acid vapours, a current of hydrogen is passed through the tube. The reaction gases or vapours are treated to recover the methoxy acetic anhydride precisely in the manner described in Example 1.

*Example 3*

Methoxy acetic acid vapour is caused to mix with steam previously superheated to 800° C., sufficient steam being employed to raise the temperature of the acid vapour to between about 500° and 700° C. The resulting mixture is treated to recover the methoxy acetic anhydride by causing the vapours first to pass over calcium chloride maintained at a temperature between 250° and 300° C. (whereby the water is substantially absorbed) and thereafter subjecting the vapours to condensation.

What I claim and desire to secure by Letters Patent is:—

1. Process for the manufacture of an alkoxy aliphatic anhydride which comprises subjecting the vapors of an alkoxy aliphatic acid to thermal decomposition at a temperature between 300° and 1200° C.

2. Process for the manufacture of an alkoxy aliphatic anhydride which comprises subjecting the vapors of an alkoxy aliphatic acid to thermal decomposition at a temperature between 500° and 800° C.

3. Process for the manufacture of an alkoxy aliphatic anhydride which comprises subjecting the vapors of an alkoxy aliphatic acid to thermal decomposition in presence of at least one water-binding agent at a temperature between 500° and 800° C.

4. Process for the manufacture of methoxy acetic anhydride which comprises subjecting the vapors of methoxy acetic acid to thermal decomposition at a temperature between 300° and 1200° C.

5. Process for the manufacture of methoxy acetic anhydride which comprises subjecting the vapors of methoxy acetic acid to thermal decomposition at a temperature between 500° and 800° C.

6. Process for the manufacture of methoxy acetic anhydride which comprises subjecting the vapors of methoxy acetic acid to thermal decomposition in presence of sodium pyrosulphate at a temperature between 500° and 800° C.

7. Process for the manufacture of an alkoxy aliphatic anhydride which comprises subjecting the vapors of an alkoxy aliphatic acid to thermal decomposition at a temperature between 500° and 800° C. in the presence of a catalyst comprising at least one phosphoric acid.

8. Process for the manufacture of an alkoxy aliphatic anhydride which comprises subjecting the vapors of an alkoxy aliphatic acid to thermal decomposition at a temperature between 500° and 800° C. in the presence of a catalyst comprising metaphosphoric acid.

9. Process for the manufacture of an alkoxy aliphatic anhydride which comprises subjecting the vapors of an alkoxy aliphatic acid to thermal decomposition at a temperature between 500° and 800° C. in the presence of a catalyst comprising at least one salt of a phosphoric acid.

10. Process for the manufacture of an alkoxy aliphatic anhydride which comprises subjecting the vapors of an alkoxy aliphatic acid to thermal decomposition at a temperature between 500° and 800° C. in the presence of a catalyst comprising an alkali metal salt of metaphosphoric acid.

In testimony whereof I have hereunto subscribed my name.

HENRY DREYFUS.